Patented May 11, 1943

2,318,932

UNITED STATES PATENT OFFICE 2,318,932

PROCESS FOR PRODUCING ASPHALT EMULSIONS

Robert A. Dunham, Long Beach, Calif., assignor to Union Oil Company of California, Los Angeles, Calif., a corporation of California No Drawing. Application January 30, 1940, Serial No. 316,359

3 Claims. (Cl. 252—311.5)

The present invention relates to aqueous emulsions of bitumen or asphalt and the like and to a process for producing the same. Such emulsions are suitably employed as binders, adhesives and coating compositions, and are more particularly employed in road building.

Heretofore, it has been proposed to produce bituminous emulsions for use in road laying and for other commercial purposes by heating the bituminous substance, such as asphalt, to a temperature above its melting point, and then adding a saponifiable material to the melted asphalt such as, for example, a fatty acid, rosin or rosin oil. The mixture is then agitated with an aqueous solution of alkali, such as, for example, caustic soda or potash or sodium or potassium carbonate, to effect emulsification of the asphalt. In many instances, the saponifiable material is added to the aqueous solution containing the alkali resulting in the formation of a soap solution which is used to mix with the melted asphalt to form the emulsion.

In California and other States, certain commercial asphalt emulsions must conform to certain specifications which usually require a viscosity of not greater than 55 seconds Saybolt furol at 77° F. and a demulsibility of not less than 60% by the Meyers test, (A. S. T. M. Method D244-39). Emulsions of such characteristics are generally termed "quick-breaking" emulsions in that they break rapidly when applied to aggregate on the road bed. Thus, by using this type of emulsion, the road may be built by merely spraying the emulsion on the road bed whereupon the emulsion penetrates into the voids of the aggregate and breaks to liberate the asphalt particles which coat and bind the aggregate.

I have observed that it is characteristic of some asphalts, that is, asphalts produced from certain asphalt-containing crude oils, to produce emulsions of exceedingly high viscosity or low demulsibility, or both, so that these asphalts cannot be used to produce commercial emulsions of high demulsibilities and low viscosities.

For example, asphalts produced from such crude oils obtained from the oil fields near or about Coalinga, McKittrick, Kern River, Kern Front and other San Joaquin Valley oil fields in California are not adapted to produce emulsions satisfying the above specifications with regard to demulsibility of greater than 60 and viscosity less than 55 seconds Saybolt furol at 77° F. using a specified amount of soap as the emulsifying agent. These asphalts typically produce emulsions having demulsibilities below 60 or viscosities above 55 seconds Saybolt furol at 77° F. or both. On the other hand, asphalts produced from such crude oils obtained from the oil fields near or about Mount Poso in California are adapted to produce satisfactory emulsions of high demulsibility and low viscosity when using the same specified amount of soap as the emulsifying agent. In the past, this difference in behavior of asphalts has necessitated the segregation of crude oils from selected oil fields as sources to produce asphalts therefrom for emulsification purposes.

It is an object of my invention to produce satisfactory emulsions of high demulsibilities and low viscosities from asphalts which heretofore resulted in the production of unsatisfactory emulsions.

Another object of my invention is to treat such asphalts which, without treatment, are unsuitable to produce satisfactory emulsions, in order to convert said asphalts into desirable emulsifying asphalts.

Other objects and features of my invention will be apparent from the following description of my invention and from specific examples disclosed herein.

I have discovered that the emulsifying characteristics of the aforementioned asphalts which do not produce emulsions of the hereinbefore mentioned specifications may be modified to yield asphalts which may be emulsified to produce emulsions of satisfactory high demulsibilities and low viscosities, by subjecting these asphalts to heat treatment at elevated temperatures for prolonged periods of time. The effective temperature which I have found satisfactory for heat treating such asphalts will vary with the asphalt undergoing treatment. Generally, however, the temperature to which the asphalt is best treated will be in the neighborhood of not less than about 625° F. as a lower limit. The upper limit of heat treatment, however, should be restricted so that severe cracking is not effected and the quality of the asphalt is not impaired. I have been able to successfully heat treat asphalts to produce desirable emulsifying asphalts at temperatures of about 700° F.

In general, I have observed that in a satisfactory heat treatment, the physical characteristics of the asphalt are not changed materially and yet, heating is carried out at temperatures near cracking. For example, in the heat treating runs which I have carried out at temperatures of about 640–700° F. for prolonged periods of time, the melting point and penetration of the asphalt were not changed materially and yet some small amounts of light overhead distillates were produced indicating that the heat treatment was carried out at or near the incipient cracking temperatures of these particular asphalts. These observations would indicate that the heat treatment has the effect of modifying the chemical characteristics of the asphalt resulting in either destroying the constitutents present in the asphalt which tend to produce low demulsibilities or reducing the amount of materials which effect emulsification of such proper quantity as is necessary to produce proper emulsification or generating compounds in the asphalt which tend to produce high demulsibilities and low viscosities.

The time or duration of the heat treatment will also depend on the characteristics of the asphalt but additionally, will depend on the particular apparatus, as for example, its type and dimensions, employed for carrying out the heat treatment. For example, when the heat treatment is carried out in a relatively shallow pan the time necessary to obtain the desired effect will be considerably less than when a shell type still is used. For example, when heat treating a small charge, four inches deep and four inches in diameter, of the asphalt in a shallow iron pan to 700° F. on a laboratory hot plate, I obtained the desired modification of the asphalt in about thirty minutes, yet when a 5 or 6 kg. charge of the same asphalt was heated in a small shell still to 680° F., it required three hours to obtain the desired modification and when a charge of 125 barrels of the same asphalt was heat treated in a commercial shell still, it required approximately eight hours to complete the desired modification of the asphalt at such temperatures. It seems therefore, that the time of heat treatment is a function of the depth or bulk of the asphalt undergoing treatment.

The heat treatment beyond the point at which the desired modification is obtained is undesirable for the reason that asphalt deteriorates with regard to its emulsifying characteristics. For example, in my experimentation with treating asphalts, I have been able to produce satisfactory emulsifying asphalts by heat treating the unsatisfactory emulsifying asphalt at the specified temperatures; yet when the heat treating was continued for several hours thereafter, it was found that the asphalt no longer emulsified to produce emulsions of high demulsibilities and low viscosities, the emulsions produced from the asphalt being increasingly darker and increasingly unstable with the continued heating of the asphalt. In fact, some asphalts so treated emulsified incompletely. However, when a portion of the thus treated asphalt was blended with the original untreated asphalt and the blend was emulsified, it was found that the blend of asphalts resulted in the production of an emulsion which was satisfactory with regard to demulsibility and viscosity. Thus, it is possible according to my invention to correct such asphalts which have been over heat treated by the addition thereto of regulated amounts of the same or similar asphalts which have not been subjected to the heat treatment. This phenomenon of being able to correct asphalts which have been over heat treated by addition of untreated asphalt is desirable from an operation standpoint, since as stated previously, the time and temperature to which the asphalt must be heated will vary with different asphalts and thus the conditions under which the asphalts are heat treated will be difficult to determine beforehand and since in the final analysis, the test as to whether the asphalt has been satisfactorily heat treated is whether the asphalt emulsifies to produce a satisfactory emulsion. Quite often this factor will not be known until the asphalt has been subjected to emulsification.

Therefore, it is another feature of my invention to blend untreated asphalt with over heat treated asphalt to produce a blend of asphalt of satisfactory emulsifying behavior.

The following examples will illustrate the features of my invention; these however, are not to be construed as limiting my invention.

*Example 1*

An asphalt was produced by heating Coalinga crude oil in a coil to a temperature of about 650° F. and passing it with steam into a fractionating column where the vaporizable constituents such as gasoline, kerosene, gas oil and light lubricating oils were distilled and fractionated and the asphalt was produced as a distillation bottoms having a penetration of 300 at 77° F. and 56 at 32° F. and a flash point of 475° F. (Cleveland open cup method). A shallow iron pot about 4 inches in diameter and about 4 inches deep was filled with this asphalt. The pot was covered and placed on a hot plate where it was heated to about 700° F. in about 30 minutes and then allowed to cool to 300° F. This heated charge of asphalt was then emulsified by adding it to a quantity of water containing 0.35% by weight of rosin oil and 0.35% by weight of sodium hydroxide, these percentages being based upon the finished emulsion. During the addition of the melted asphalt to the aqueous solution, the mixture was agitated by means of an electrical mixer of the two-paddle egg beater type operated at a medium speed. Mixing was continued until the asphalt was thoroughly emulsified with the aqueous solution. The final emulsion containing about 43% by weight of water showed a demulsibility of 89.9 and a viscosity of 27 seconds Saybolt furol at 77° F.

A portion of the untreated Coalinga 300 penetration asphalt was emulsified in the same way as above using substantially the proportions of soap constituents and water. This emulsion showed a demulsibility of only 12.0 and a viscosity of 161 seconds Saybolt furol at 77° F.

*Example 2*

A 5 or 6 kg. charge of the same untreated asphalt was heated in a still to 680° F. in about three hours during which time about 25 ml. of light distillate was produced. The charge was drawn at about 500° F. and showed a flash point of 420° F. and a penetration of 128 at 32° F. A portion of the thus treated asphalt was emulsified using the same formulation as in Example 1. The emulsion showed a demulsibility of 94.6 and a viscosity of 23 seconds Saybolt furol at 77° F.

Another portion of the thus treated asphalt was blended in equal proportions with the aforementioned untreated asphalt and the blend was emulsified as before. The emulsion thus produced showed a demulsibility of 72.5 and a viscosity of 21 seconds Saybolt furol at 77° F. This experiment indicates that even though a lowering in demulsibility of the treated asphalt is obtained by the addition of an equal amount of untreated asphalt to the treated asphalt, the reduction in demulsibility is not in direct proportion to the blending of untreated and treated asphalts. It would normally be expected that an emulsion composed of equal amounts of untreated and treated asphalts would have a demulsibility of about half that between 12.0 for the untreated asphalt emulsion and 94.6 for the treated asphalt emulsion.

*Example 3*

An asphalt produced by distilling a mixture of crude oils obtained from oil wells in the San Joaquin Valley to produce a bottoms having a penetration of about 250 seconds at 77° F. was heated from 300° F. to 650° F. in about an hour in a laboratory iron shell still and was held at this temperature of 650° F. for an additional four hours. Portions of the asphalt undergoing heat treatment were withdrawn at each hour and these were emulsified using 43% by weight of an aqueous solution containing 0.20% by weight sodium hydroxide and 0.30% by weight rosin oil, all percentages being based upon the finished emulsion. The untreated asphalt before being subjected to heat treatment was emulsified using the same formulation. The emulsion had an extremely high viscosity and a low demulsibility of 8.2.

The emulsion produced from the portion of asphalt withdrawn at the end of the first hour showed a demulsibility of 12.1 and a viscosity of 175 seconds; that produced from asphalt withdrawn at the end of the second hour showed a demulsibility of 67.4 and a viscosity of 235 seconds; that produced from asphalt withdrawn at the end of the third hour showed a demulsibility of 95.5 and a viscosity of 145 seconds; that produced from asphalt withdrawn at the end of the fourth hour showed a demulsibility of 98.3 and a viscosity of 18 seconds Saybolt furol at 77° F. The asphalt which was withdrawn at the end of five hours of heat treatment failed to emulsify.

*Example 4*

A portion of the untreated asphalt used in Example 3 was steam-topped at a temperature of 650° F. to remove 22% of heavy oil fractions and to produce an asphalt of 40-50 penetration. These bottoms were heated at 650° F. for 1.5 hours. A portion of the thus treated asphalt was recomposed to produce a 250 penetration asphalt by the addition of heavy oil fraction which was previously removed by steam topping. The recomposed asphalt was emulsified using the formulation of Example 3. The emulsion showed a viscosity of 28 seconds and a demulsibility of 60.8 indicating that it was just passable from a California specification standpoint.

The asphalt remaining in the still was heated an additional hour at 650° F. and a portion was then withdrawn, recomposed to a 250 penetration asphalt by the addition of the heavy oil fraction and was emulsified as above. This emulsion showed an improved demulsibility of 93.2 and a viscosity of 21 seconds Saybolt furol at 77° F.

*Example 5*

In order to determine the effect of heat treatment in commercial operations, a 125 barrel charge of the original asphalt of Example 4 having a penetration of 250 seconds at 77° F. was distilled in a shell still with steam at 725° F. to produce a bottoms having a penetration of 42 seconds at 77° F. The overhead distillate was collected. The bottoms were subjected to heating at 650° F. for about 20 hours. Portions of the asphalt were withdrawn at the end of every four hours and each portion was recomposed to a 250 penetration asphalt by the addition of the previously removed distillate and these portions were emulsified using the formulations of Example 3, i. e. 0.2% sodium hydroxide and 0.3% rosin oil. The emulsion produced from the asphalt which had been heat treated for four hours showed a demulsibility of 36 and a viscosity of 45 seconds; that produced from the asphalt which had been heat treated 8 hours had a demulsibility of 87 and a viscosity of 32 seconds; that produced from the asphalt which had been heat treated 12 hours had a demulsibility of 96 and a viscosity of 27 and that produced from the asphalt which had been heat treated 16 hours had a demulsibility of 98 and a viscosity of 26 seconds Saybolt furol at 77° F. The asphalt which had been heat treated 20 hours could not be emulsified using the same formulation indicating that it had been over-heat treated.

The foregoing indicates that when a large batch of asphalt is subjected to heat treatment in accordance with my invention, it requires a considerably longer time to effect the desired heat treatment than when a relatively small amount of the same asphalt is subjected to the heat treatment. For example, by comparing the above emulsions with those produced in Example 4, it will be seen that it required about 12 hours of heat treatment with the large batch of asphalt to produce an asphalt which emulsified to the characteristics of the asphalt in Example 4 which had been heat treated only 2.5 hours.

The over heat treated asphalt obtained at the end of 20 hours was blended with the same but untreated asphalt in the ratio of three parts of over heat treated asphalt to one part of untreated asphalt. An emulsion produced from this blend of asphalts using the same formulation showed a demulsibility of 89 and a viscosity of 35 seconds Saybolt furol at 77° F. This indicates that in cases where the asphalt has been over heat treated, it may be corrected by blending it with untreated asphalt.

In the foregoing examples, the heat treatment was carried out at substantially atmospheric pressure. If desired, this heat treatment may be conducted under superatmospheric pressures and this will have an effect of preventing distillation of the more volatile constituents of the asphalt. If desired, air or other oxygen-containing gas may be introduced into the charge during the heat treatment.

In the above description of my invention and in the examples, I have indicated the use of regulated amounts of soap to effect the emulsification of the asphalt. It is however within the scope of my invention to use other emulsifying agents to effect the emulsification. Such emulsifying agents include caustic alkalies such as sodium or potassium hydroxide, sodium or potassium carbonate, oleate, stearate, palmitate, etc.

The emulsions heretofore described are of the quick-breaking type as evidenced by high demulsibilities and thus are adapted for use in road laying by the so-called penetration method which consists essentially in spraying or pouring the emulsion on the road bed containing the aggregate. However, these emulsions may be converted into slow breaking emulsions which permits them to be mixed with aggregate without premature breaking of the emulsion by the addition of small amounts of, say 0.5 to 2.0% by weight, suitable stabilizing agents. This is preferably accomplished after the quick-breaking emulsion has been cooled to a temperature below approximately 100° F. As stabilizing agents, I may employ casein, glue, blood albumen, starch, gum acacia, agar agar, algin, gum tragacanth, pectin, Irish moss and other agents of the protein and carbohydrate type.

The foregoing description of my invention is not to be considered as limiting since many variations may be made by those skilled in the art within the scope of the following claims.

I claim:

1. A process for the production of an asphalt emulsion of the oil-in-water type having a demulsibility above 60 and a viscosity below 55 seconds Saybolt furol at 77° F. from an asphalt which will not emulsify to produce an emulsion of said demulsibility and viscosity characteristics which comprises heating said asphalt at a temperature of approximately 625–700° F. for a period of time greater than 30 minutes, sufficient to convert said asphalt into a product which when commingled with water and an emulsifying agent will emulsify to produce an emulsion having a demulsibility test above 60 and commingling said heated asphalt with water and a relatively small amount of an emulsifying agent to emulsify said heated asphalt.

2. A process as in claim 1 in which said heated asphalt emulsion having a demulsibility above not been subjected to said heat treatment before being emulsified with said water and emulsifying agent.

3. A process according to claim 1 in which the asphalt emulsion having a demulsibility above 60 is converted into a slow breaking emulsion having a demulsibility below 60 by the addition to said emulsion of a relatively small amount of a stabilizing agent.

ROBERT A. DUNHAM.

CERTIFICATE OF CORRECTION.

May 11, 1943.

Patent No. 2,318,932.

ROBERT A. DUNHAM.

It is hereby certified that error appears in the printed specification of the above numbered patent requiring correction as follows: Page 4, second column, line 9, claim 2, for "emulsion having a demulsibility above" read --is first blended with asphalt which has--; and that the said Letters Patent should be read with this correction therein that the same may conform to the record of the case in the Patent Office.

Signed and sealed this 16th day of November, A. D. 1943.

Henry Van Arsdale,
Acting Commissioner of Patents.

(Seal)